(12) United States Patent
Maier et al.

(10) Patent No.: US 9,163,616 B2
(45) Date of Patent: Oct. 20, 2015

(54) PASSIVE CLOSING DEVICE FOR THERMAL SELF-PROTECTION OF HIGH PRESSURE GAS VESSELS

(71) Applicant: GM Global Technology Operations LLC, Detroit, MI (US)

(72) Inventors: Oliver Maier, Worms (DE); Jurgen Thyroff, Harxheim (DE); Bjoern Zoerner, Trebur (DE); Ralph Hobmeyr, Mainz-Kastel (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/255,189

(22) Filed: Apr. 17, 2014

(65) Prior Publication Data

US 2014/0223899 A1    Aug. 14, 2014

Related U.S. Application Data

(63) Continuation of application No. 13/343,848, filed on Jan. 5, 2012, now Pat. No. 8,794,254.

(51) Int. Cl.

| | |
|---|---|
| *F16K 17/14* | (2006.01) |
| *F03G 7/06* | (2006.01) |
| *F16J 13/24* | (2006.01) |
| *F17C 13/00* | (2006.01) |
| *F16K 17/38* | (2006.01) |

(52) U.S. Cl.
CPC . *F03G 7/06* (2013.01); *F16J 13/24* (2013.01); *F16K 17/38* (2013.01); *F17C 13/00* (2013.01); *F17C 2201/0109* (2013.01); *F17C 2205/0311* (2013.01); *F17C 2205/0335* (2013.01); *F17C 2221/012* (2013.01); *F17C 2223/0123* (2013.01);
(Continued)

(58) Field of Classification Search
CPC ............ F03G 7/06; F16J 13/24; F16K 17/38; Y02E 60/321; F17C 2221/012; F17C 13/00; F17C 2201/0109; F17C 2205/0311; F17C 2205/0335; F17C 2223/0123; F17C 2223/035; F17C 2260/023; F17C 2270/0763; Y10T 137/7737; Y10T 137/0324; Y10T 137/1797
USPC .......... 137/67, 72, 75, 468, 910, 457; 251/11; 236/64, 99 K, 99 R, 100
See application file for complete search history.

(56) References Cited

U.S. PATENT DOCUMENTS 2,762,569 A * 9/1956 Caillol ........................ 236/20 R
2,924,975 A    2/1960 Vernet
(Continued)

FOREIGN PATENT DOCUMENTS

| DE | 2152588 A1 | 5/1972 |
|---|---|---|
| GB | 2387891 A | 10/2003 |
| JP | H05196170 A * | 8/1993 |

*Primary Examiner* — Jessica Cahill
(74) *Attorney, Agent, or Firm* — Fraser Clemens Martin & Miller LLC; James D. Miller

(57) ABSTRACT

High pressure gas vessels can have a sensitivity to temperature of the compressed gas. Over-temperature conditions in particular may cause decreased durability and/or vessel damage, including gas leakage to the environment. Articles of manufacture, methods, and systems are provided for over-temperature protection using a passive device. The passive closing device does not require electrical power and no controller, sensors, or wiring is needed. This affords cost savings in comparison to other systems. Pressure vessels using the passive closing device can protect themselves, independent of the compressed gas fueling station configuration.

20 Claims, 3 Drawing Sheets

(52) U.S. Cl.
CPC ..... *F17C 2223/035* (2013.01); *F17C 2260/023* (2013.01); *F17C 2270/0763* (2013.01); *Y02E 60/321* (2013.01); *Y10T 137/0324* (2015.04); *Y10T 137/1797* (2015.04); *Y10T 137/7737* (2015.04)

(56) References Cited

U.S. PATENT DOCUMENTS

| | | | |
|---|---|---|---|
| 3,128,043 A * | 4/1964 | Feinberg | 236/93 R |
| 3,173,245 A * | 3/1965 | Schutmaat | 60/527 |
| 3,797,805 A * | 3/1974 | Nielsen | 251/214 |
| 5,033,865 A * | 7/1991 | Kuze | 374/160 |
| 5,365,963 A * | 11/1994 | Hoffmann | 137/67 |
| 5,381,951 A * | 1/1995 | Michel | 236/34.5 |
| 5,649,567 A * | 7/1997 | Butler et al. | 137/468 |
| 5,984,197 A * | 11/1999 | Surgarek | 236/93 A |
| 6,029,689 A * | 2/2000 | Arai et al. | 137/106 |
| 6,742,554 B1 | 6/2004 | Immel | |
| 7,175,102 B2 * | 2/2007 | Inoue | 236/100 |
| 2005/0061893 A1 * | 3/2005 | Inoue | 236/100 |

* cited by examiner

PASSIVE CLOSING DEVICE FOR THERMAL SELF-PROTECTION OF HIGH PRESSURE GAS VESSELS

CROSS-REFERENCE TO RELATED APPLICATIONS

This application is a continuation of U.S. patent application Ser. No. 13/343,848 filed on Jan. 5, 2012. The entire disclosure of the above application is incorporated herein by reference.

FIELD OF THE INVENTION

The present technology relates to pressure vessels, including a passive closing device responsive to temperature during filling of a pressure vessel.

BACKGROUND OF THE INVENTION

This section provides background information related to the present disclosure which is not necessarily prior art.

Various high pressure containers can be classified into four types: a Type I vessel having an all-metal construction; a Type II having a metal lined construction with a fiberglass hoop wrap; a Type III having a metal lined construction with a composite full wrap; and a Type IV having a plastic lined construction with a composite full wrap. Such high pressure vessels can be used to contain a compressed gas, such as compressed hydrogen, and can provide the necessary mechanical stability and integrity to prevent rupture or bursting of the pressure vessel. Pressure vessels for use in a vehicle can also be made using lightweight materials so they do not significantly affect the weight requirements of the vehicle. In certain cases, the Type IV pressure vessel can be used for storing compressed or liquified hydrogen gas for use as a vehicle fuel.

As described by Immel in U.S. Pat. No. 6,742,554, incorporated herein by reference in its entirety, the Type IV pressure vessel contemplated for storage of hydrogen gas is generally cylindrical in shape to provide the desired integrity, and includes an outer structural wall and an inner liner defining a container chamber therein. The combination of the outer wall and the liner can provide structural integrity, pressure containment, and gas tightness in a lightweight and cost effective manner.

Such pressure vessels can include an adapter that provides the inlet and outlet opening for the gas. The adapter can house various valves, pressure regulators, piping connectors, excess flow limiter, etc. These components allow the pressure vessel to be filled with the compressed gas and allow the compressed gas to be discharged from the pressure vessel at or near ambient pressure, or a higher pressure, and be delivered as a fuel source; for example, to a fuel cell power plant. The adapter can be made of steel to provide structural strength for storing the compressed gas. A suitable adhesive, sealing ring, or the like can be employed to seal the liner to the adapter in a gas tight manner, and secure the adapter to the outer wall of the vessel.

High pressure gas vessels can be sensitive to temperature, including the temperature of the contained gas. For example, certain temperature conditions may cause a decrease in durability.

SUMMARY OF THE INVENTION

The present technology includes systems, methods, and articles of manufacture that can protect a pressure vessel during filling with a compressed gas.

A thermally responsive element is provided that comprises a sleeve and a piston positioned within the housing. The sleeve includes a first opening and a second opening. The piston includes a first end exiting the first opening, a second end exiting the second opening, and a member partitioning a thermally responsive material, such as a wax, within the housing from a space within the housing. The thermally responsive material expands at a threshold temperature to urge the member toward the space thereby extending the first end of the piston from the sleeve while the second end retracts toward the sleeve.

A passive closing is provided that comprises a body and a thermally responsive element as described herein. The body includes a bore in fluid communication with a passage. The bore runs from an exterior of the body to the passage and includes a seat between the bore and the passage. The passage runs to the exterior of the body. The first end of the piston is disposed within the body and is configured to engage the seat to seal the bore from the passage.

A pressure vessel is provided that comprises a tank and a passive closing device as described herein. The tank includes an interior, an exterior, and an opening. The passive closing device is coupled to the opening. The bore of the passive closing device is in fluid communication with the exterior of the tank and the passage of the passive closing device is in fluid communication with the interior of the tank.

A system is provided that includes a pressure vessel as described herein, a receptacle for filling the pressure vessel fluidly coupled to the pressure vessel, and a power plant fluidly coupled to the pressure vessel. The power plant can include a fuel cell and the pressure vessel can contain compressed hydrogen.

A method for thermally protecting a pressure vessel during filling is provided that comprises filling a pressure vessel as described herein with a compressed gas. The pressure vessel can include an inner layer comprising a polymer and the compressed gas can comprise hydrogen.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION OF EXEMPLARY EMBODIMENTS OF THE INVENTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding the methods disclosed, the order of the steps presented is exemplary in nature, and thus, the order of the steps can be different in various embodiments where possible.

The present technology provides thermal protection during the transfer of compressed gas in high pressure gas vessels using a passive closing device. In certain cases, it is desirable to thermally protect high pressure gas vessels using a robust and reliable mechanism that does not require an external power source or monitoring. As such, the present passive closing device can provide thermal self-protection (neither electrical power nor sensors or controllers are required) to mitigate temperature related issues during a filling or discharging operation. For example, during filling of a pressure vessel, thermodynamic laws provide that the compression of a gas into a reduced volume increases a temperature of the gas. This can also result in a temperature increase at the inner surface of the pressure vessel as it is filled with the compressed gas.

In some cases, the pressure vessel can comprise a polymer layer to reduce a weight of the vessel. Some polymer materials can be temperature sensitive. To avoid exposing the pressure vessel to temperatures that may adversely affect the vessel construction, compressed gas flow during filling of the pressure vessel can be reduced or shut off when a threshold temperature is reached. The present technology provides a passive closing device for this shut off function. The passive closing device can be part of the adaptor for filling and discharging compressed gas relative to the vessel, where the device interrupts compressed gas flow into the vessel at a threshold temperature.

Figure 1:
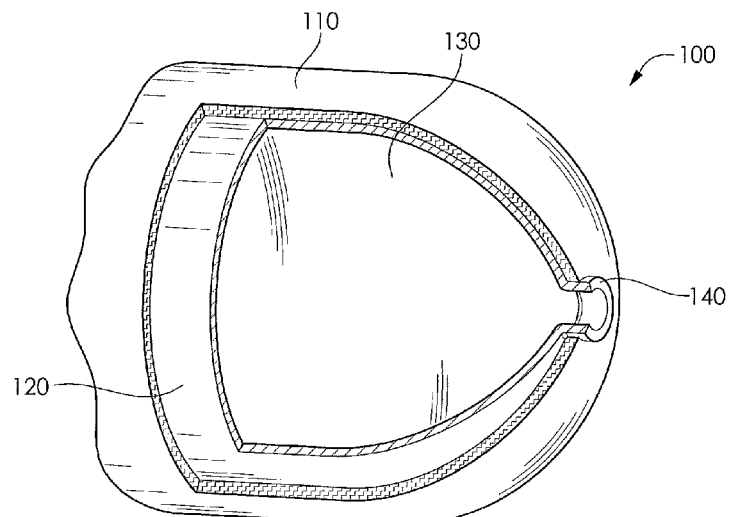
FIG. 1 is a fragmentary perspective view with a portion cutaway of an embodiment of a Type IV pressure vessel.

As an example, a Type IV pressure vessel 100 used in high pressure fuel tank systems can have a two-layer fiber composite construction, as shown in FIG. 1. An outer layer 110 can provide mechanical strength and can include materials such as a carbon fiber matrix and/or a fiberglass wrap. An inner layer 120 can comprise a polymeric material that provides a fluid-tight liner to contain a pressurized gas within an interior 130 of the pressure vessel 100. Where the inner layer 120 includes one or more polymers, these materials can be temperature sensitive, especially to high temperatures which can affect properties of the polymers. An opening 140 can provide fluid communication with the interior 130 of the pressure vessel 100 and can be configured to receive an adaptor (not shown).

Figure 2:
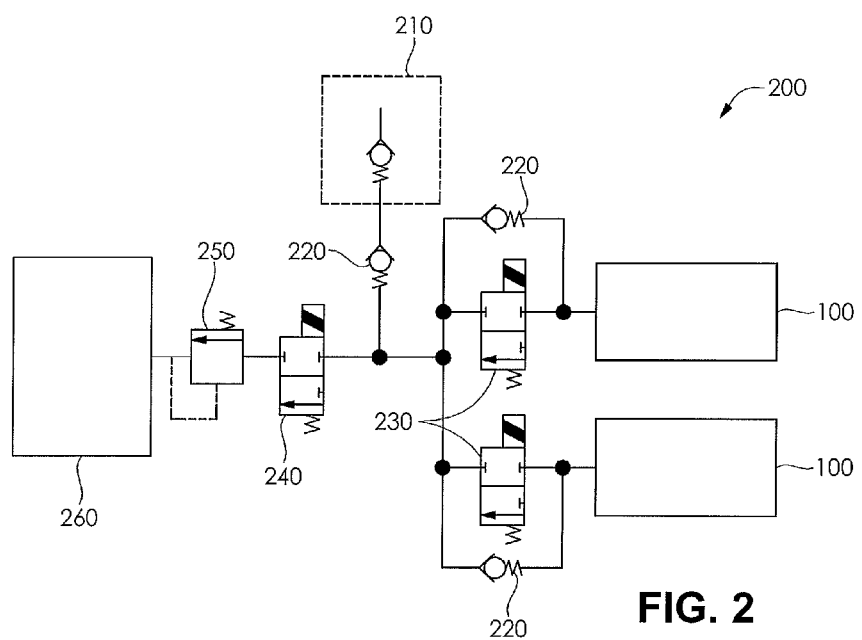
FIG. 2 is a schematic view of an embodiment of a system employing two pressure vessels.

FIG. 2 shows a simplified schematic of a system 200 including two pressure vessels 100. A receptacle 210 is provided for connection to a compressed gas source (not shown) to fill the pressure vessels 100. For example, the compressed gas source can be a refueling station for a vehicle. Compressed gas from the receptacle 210 can flow through check valves 220 into one or both of the pressure vessels 100. While filling, tank valves 230 and a shutoff valve 240 can be closed. For example, the tank valves 230 are usually not designed for high gas flows used during filling of the pressure vessels 100. The high compressed gas flow during a filling operation can therefore be handled by the check valves 220 that can have higher cross sectional areas. During discharge of the compressed gas from the pressure vessels 100, for example where the gas is hydrogen, the compressed gas can be directed through a pressure regulator 250 that controls the flow of compressed gas to a user of the gas 260, such as a fuel cell.

In some embodiments, the system 200 shown in FIG. 2 can monitor a temperature of the compressed gas and thus, a temperature of the pressure vessel 100 and the inner layer 120 using one or more temperature sensors and/or controllers that communicate with a filling station (not shown). However, the pressure vessel 100 in the system 200 can be fitted with a passive closing device 300 as shown in FIG. 3 in place of such sensors and controllers.

The passive closing device 300 can be coupled to the opening 140 of the pressure vessel 100 or can be part of an adaptor (not shown) coupled to the opening 140. The passive closing device 300 includes a main body 305 for coupling to the pressure vessel 100 at the opening 140. The body 305 can include a housing member 310 that can comprise a portion of the body 305, or the housing member 310 can be a separate component coupled to the body 305. A sleeve 315 is coupled to the housing member 310 and includes a piston 320 having a first end 325 and a second end 330. The first end 325 extends from a first opening 335 formed in the sleeve 315 and the second end 330 extends from a second opening 340 formed in the sleeve 315. The first and second openings 335, 340 can be configured to have fluid tight seals between the piston 320 and the sleeve 315. The sleeve 315 and the piston 320 comprise parts of a thermally responsive element 400, as shown in further detail in FIGS. 4 and 5.

Figure 3A:
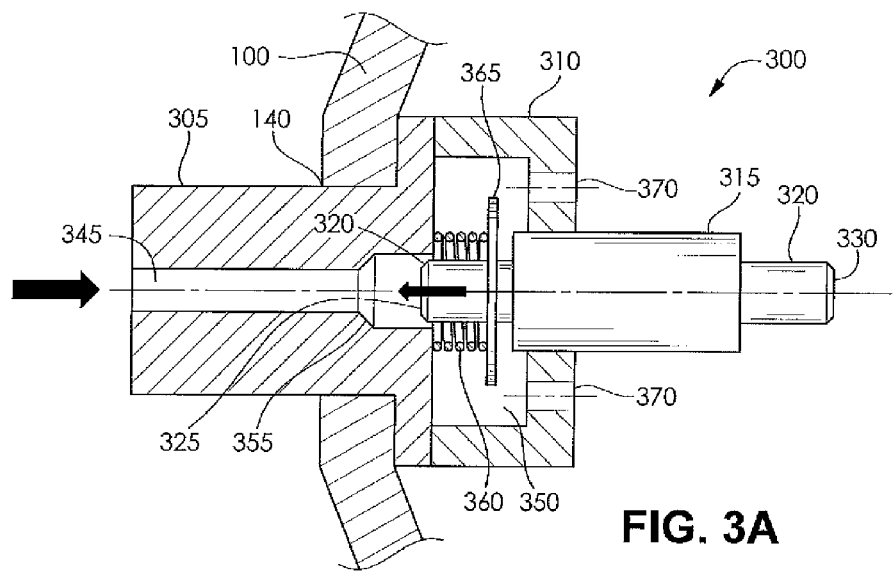
FIG. 3A is a fragmentary cross-section elevational view of an embodiment of a passive closing device.
Figure 3B:
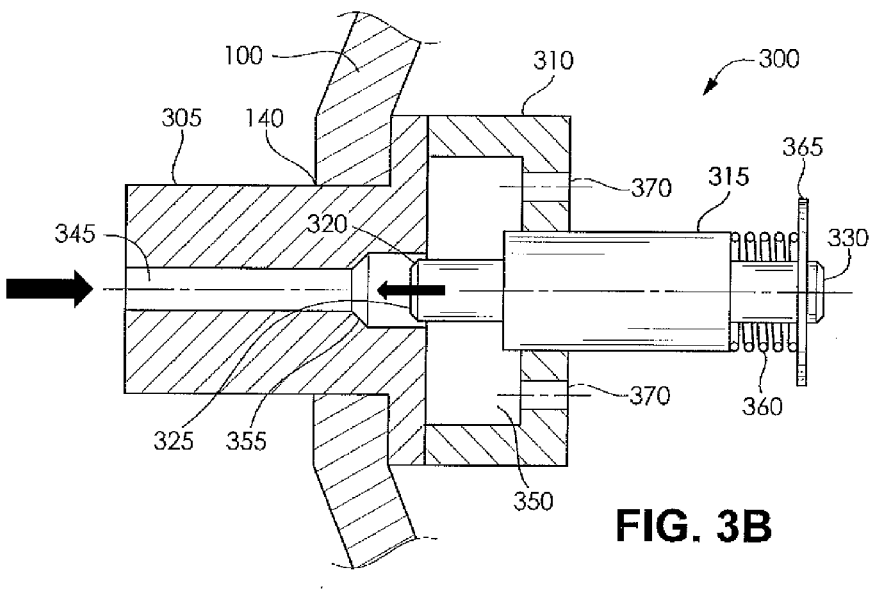
FIG. 3B is a fragmentary cross-section elevational view of another embodiment of a passive closing device.

The passive closing device 300 further includes a bore 345 that is formed through the body 305 and is in fluid communication with a chamber 350 formed by the body 305 and the housing member 310. The bore 345 includes a seat 355 configured to engage the first end 325 of the piston 320 to seal the bore 345 from the chamber 350. A spring 360 can be disposed on either side on the piston 320 that urges the piston 320 away from the seat 355. For example, as shown in FIG. 3A, the chamber 350 includes a spring 360 disposed therein and urging the piston 320 in a direction away from the seat 355. The spring 360 can be compressed between a flange 365 coupled to the piston 320 near the first end 325 and the body 305, thereby urging the flange 365 and coupled piston 320 away from the seat 355. Alternatively, as shown in FIG. 3B, the spring 360 can be positioned between a flange 365 coupled to the piston near the second end 330 and the sleeve 315, thereby urging the flange 365 and coupled piston 320 away from the seat 355.

The body 305 or the housing member 310 can include one or more passages 370 (two are shown) providing fluid communication between the chamber 350 and the interior 130 of the pressure vessel 100. In some embodiments, the chamber 350 forms a portion of the one or more passages 370. In other embodiments, the bore 345 can be fluidly coupled to the one or more passages 370 without an intervening chamber 350. In such cases, the first end 325 of the piston 320 is disposed within the body 305 and configured to engage the seat 355 to seal the bore 345 from the passage 370.

Figure 4:
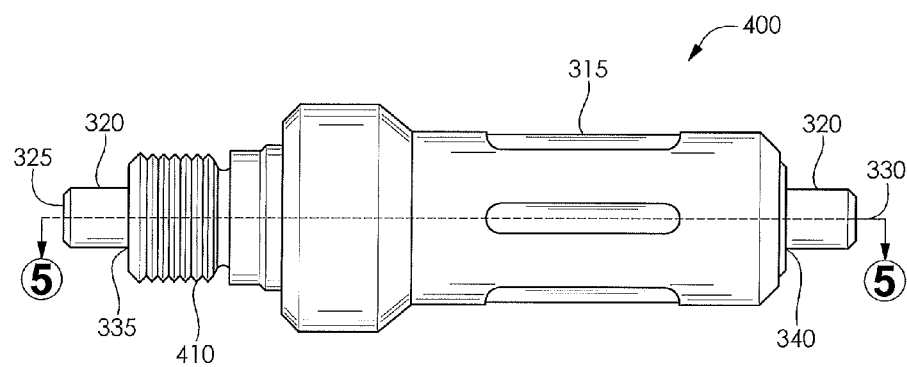
FIG. 4 is an elevational view of an embodiment of a double-ended piston thermally responsive element.
Figure 5:
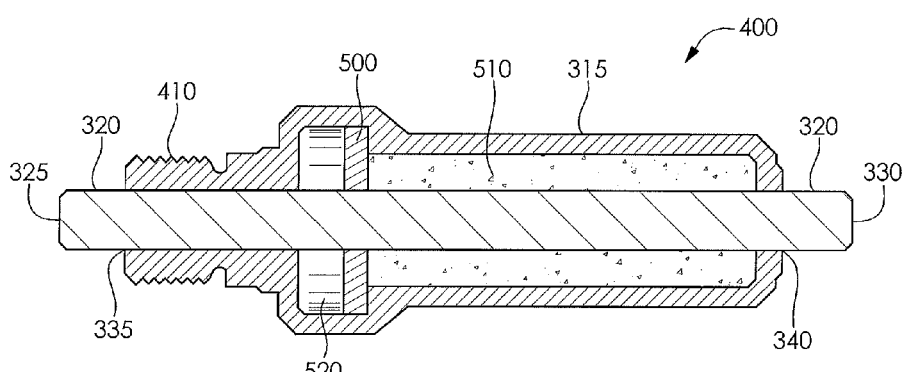
FIG. 5 is a cross-sectional elevational view of the double-ended piston thermally responsive element of FIG. 4 taken along line 5-5.

Referring now to FIGS. 4 and 5, a thermally responsive element 400 is shown. A thermally responsive material 510 such as a wax is disposed with the sleeve 315 which changes in density in relation to a threshold temperature. For example, the thermally responsive material 510 can melt upon reaching the threshold temperature, where the resulting phase change causes an increase in the volume of the thermally responsive material 510. The thermally responsive material 510 can include one or more waxes that have a relatively narrow range of carbon chain lengths. In this manner, the thermally responsive material 510 composition can be tailored to liquify at a predetermined threshold temperature. The liquefaction causes the thermally responsive material 510 in the sleeve 315 to expand so that it acts upon a pressure responsive member 500 within the sleeve 315. The member 500 can comprise a portion of the piston 320 or can be a separate component that is coupled to the piston 320. In some embodiments, the member 500 can comprise a collar extending from the piston 320 as shown in FIG. 5. The member 500 can be fixedly coupled to the piston 320 so a pressure of the thermally responsive material 510 on the member 500 causes the piston 320 to move along with the member 500. The member 500 can move or slide into a space 520 formed within the sleeve 315 when the thermally responsive material 510 liquifies and expands. The piston 320 is thereby urged in the same direction. The space 520 can be empty space or can include a compressible material, such as a foam, rubber, gas, etc. Accordingly, the first end 325 of the piston 320 extends further from the sleeve 315 while the second end 330 retracts toward the sleeve 315 when the thermally responsive material 510 melts and expands. The sleeve 315 can include a coupling means 410, such as threads, so that the thermally responsive element 400 can be coupled to the body 305 or the housing member 310 of the body 305.

The physical effect operating the passive closing device 300 is the phase change of the thermally responsive material 510 when it liquifies. If the phase change temperature is reached, the expansion of the thermally responsive material 510 starts and the piston 320 moves toward the seat 355 adjacent the bore 345 to seal the bore 345. In this manner, compressed gas can no longer be introduced through the passive closing device 300 into the interior 130 of the pressure vessel 100. In some embodiments, the threshold temperature for liquifying the thermally responsive material 510 can be selected to be below or about the tolerance limit temperature of the inner layer 120 of the pressure vessel. In this fashion, the inner layer 120 is protected from exposure to a temperature that would negatively affect the integrity of the inner layer 120. For example, where the inner layer 120 comprises a polymer liner that may be compromised above a certain temperature, the thermally responsive material 510 can be selected to liquify below or just below the certain temperature. As the thermally responsive material 510 melts, the piston 320 moves toward the seat 355, overcoming the force of the spring 360. The first end 325 and the seat 355 seal the bore 345, thereby interrupting compressed gas flow through the passive closing device 300. When the thermally responsive material 510 cools below the threshold temperature, it solidifies and contracts. The spring 360 resets the piston 320 by urging the first end 325 of the piston 320 away from the seat 355 where the member 500 moves away from the space 520. Hence the first end 325 moves toward the housing 315 while the second end 330 extends further from the housing 315.

The passive closing device 300 can compensate for the pressure of pressurized gas within the pressure vessel 100. In this regard, the piston 320 of the thermally responsive element 400 is configured to operate in a synchronous fashion where the second end 330 of the piston 320 extends from the second opening 340 of the sleeve 315 and is exposed to the pressure of gas within the interior 130 of the pressure vessel 100.

A benefit of the present technology is that thermally responsive element 400 that controls the flow of compressed gas into the pressure vessel 100 is mounted proximate to the inner layer 120 of the pressure vessel 100 and is exposed to identical or nearly identical conditions, including temperature. Thus, a more precise temperature control is possible than in conventional systems due to an improved thermal connection. Due to the low thermal mass of the thermally responsive material 510 and a surface area of the sleeve 315, there can be very little time delay between the compressed gas temperature filling the pressure vessel 100 and the temperature of the thermally responsive material 510. Furthermore, due to the hysteresis behavior of the thermally responsive material 510, the reopening temperature can be lower than the closing temperature so that there are no unstable oscillations in opening and closing of the passive closing device 300.

Other benefits of the present technology include improvements by providing a robust and reliable passive closing device 300 for use in a pressure vessel 100. The passive closing device 300 does not require electrical power and no controller, sensors, or wiring is needed. This affords cost savings in comparison to other systems. Pressure vessels using the passive closing device 300 can protect themselves, independent of the compressed gas fueling station configuration. The location and configuration of the passive closing device 300 also provides a correlation to the conditions experienced by the inner layer 120 of the pressure vessel 100.

These benefits are in contrast to other systems that have no way to reduce or interrupt the hydrogen flow into a pressure vessel. For example, there can be a high deviation between a temperature sensor signal mounted outside of the vessel and a temperature of the inner layer 120. A controller and an appropriate (electrical) interface to the refueling station are needed to adjust filling rate of the compressed gas. Such a system cannot protect itself against refueling speeds/gradients leading to an over-temperature condition. It can only send a request to the external refueling system/station to lower or stop the flow.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A thermally responsive element, comprising:
a sleeve having a first opening and a second opening; and
a unitary piston extending entirely through the sleeve and having a first end extending outwardly of the first opening, a second end extending outwardly of the second opening, and a member partitioning a thermally responsive material within the sleeve from a space within the sleeve, wherein the piston fills the first opening and the second opening and the member defines a collar directly coupled to and extending outwardly from the piston;
the thermally responsive material expanding at a threshold temperature upon a phase change thereof to urge the member toward the space, thereby extending the first end of the piston from the sleeve and retracting the second end toward the sleeve.

2. The thermally responsive element of claim 1, wherein the collar is slidably disposed within the space and in direct contact with the thermally responsive material such that a change in density of the thermally responsive material resulting from melting increases a volume of the thermally responsive material thereby acting to slidably displace both the collar and the unitary piston.

3. The thermally responsive element of claim 1, further comprising a compressible material positioned within the space, the compressible material compressed when the member is urged toward the space.

4. The thermally responsive element of claim 1, wherein the unitary piston is substantially cylindrical.

5. The thermally responsive element of claim 1, wherein the sleeve includes a threaded coupling.

6. The thermally responsive element of claim 5, wherein the threaded coupling is positioned proximate the first opening.

7. The thermally responsive element of claim 6, wherein the unitary piston extends outwardly from the threaded coupling.

8. The thermally responsive element of claim 1, wherein the thermally responsive material is a wax.

9. The thermally responsive element of claim 8, wherein the wax is positioned exterior to the unitary piston within the sleeve.

10. The thermally responsive element of claim 8, wherein the wax changes state from a solid to a liquid at the threshold temperature resulting in an increase in a volume of the wax.

11. A thermally responsive element, comprising:
a sleeve having a first opening, a second opening and a space formed within the sleeve between the first and second openings; and
a unitary piston extending entirely through the sleeve and having a first end extending outwardly of the first opening, and a second end extending outwardly of the second opening, wherein the piston fills the first opening and the second opening;
a thermally responsive material positioned in the sleeve; and
a collar directly coupled to and extending outwardly from the unitary piston, the collar slidably disposed within the space and in direct contact with the thermally responsive material;
wherein a change in a density of the thermally responsive material resulting at a melting temperature of the thermally responsive material increases a volume of the thermally responsive material slidably displacing both the collar and the piston, thereby extending the first end of the piston further away from the sleeve while moving the second end toward the sleeve.

12. The thermally responsive element of claim 11, wherein the sleeve is substantially cylindrical in shape.

13. The thermally responsive element of claim 12, wherein the unitary piston is substantially cylindrical and coaxial with the sleeve, and the thermally responsive material is positioned in the sleeve external to the unitary piston.

14. The thermally responsive element of claim 11, wherein a solidification temperature of the thermally responsive material is lower than a melt temperature of the thermally responsive material.

15. The thermally responsive element of claim 14, wherein the thermally responsive material is a wax.

16. A thermally responsive element, comprising:
a sleeve having a first opening, a second opening and a space between the first and second opening;
a unitary piston extending entirely through the sleeve and having a first end extending outwardly of the first opening, and a second end extending outwardly of the second opening, wherein the piston fills the first opening and the second opening; and
a pressure responsive member extending outwardly from the unitary piston, the pressure responsive member slidably disposed within the space and in direct contact with the thermally responsive material such that a change in a density at a melting temperature of the thermally responsive material increases a volume of the thermally responsive material thereby acting to slidably displace both the pressure responsive member and the unitary piston;
the first end of the unitary piston extending further away from the sleeve while the second end moves toward the sleeve during sliding displacement of the unitary piston.

17. The thermally responsive element of claim 16, wherein the pressure responsive member is an integrally extending portion of the unitary piston.

18. The thermally responsive element of claim 16, wherein the pressure responsive member is a collar fixedly connected to the unitary piston.

19. The thermally responsive element of claim 16, wherein the thermally responsive material is a wax positioned exterior to the unitary piston within the sleeve.

20. The thermally responsive element of claim 19, wherein the wax changes state from a solid to a liquid at the threshold temperature resulting in an increase in a volume of the wax.

* * * * *